Feb. 17, 1925.  1,527,142
D. E. KORTZ ET AL
WOODEN LINING FOR BRAKE AND TRANSMISSION BANDS
Filed March 20, 1923
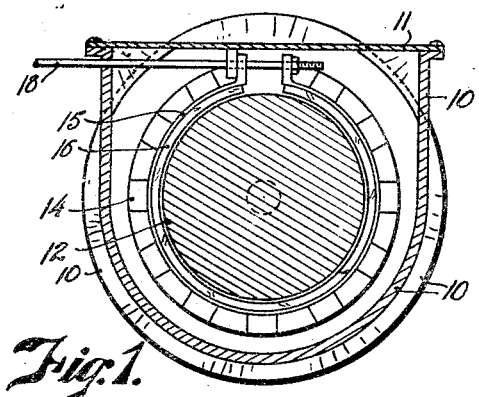
Fig. 1.
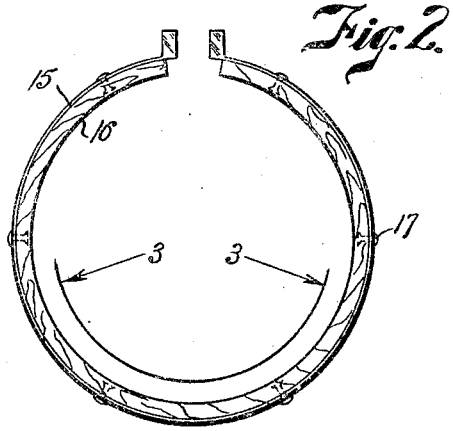
Fig. 2.
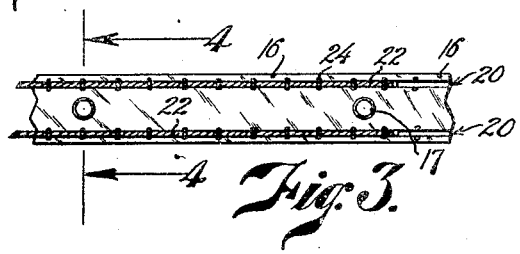
Fig. 3.
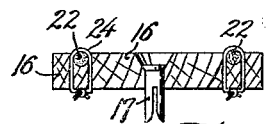
Fig. 4.
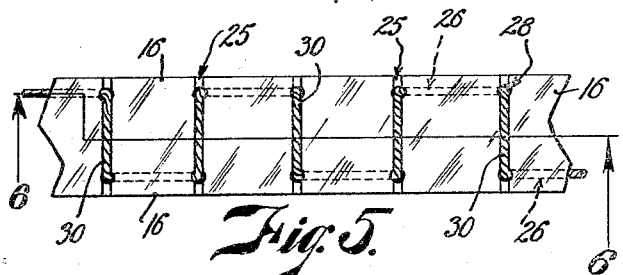
Fig. 5.
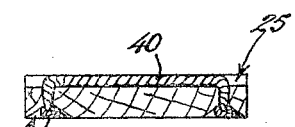
Fig. 8.
Fig. 6.
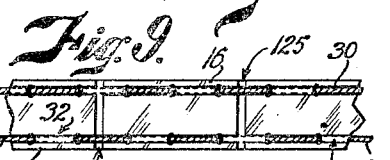
Fig. 9.
Fig. 10.
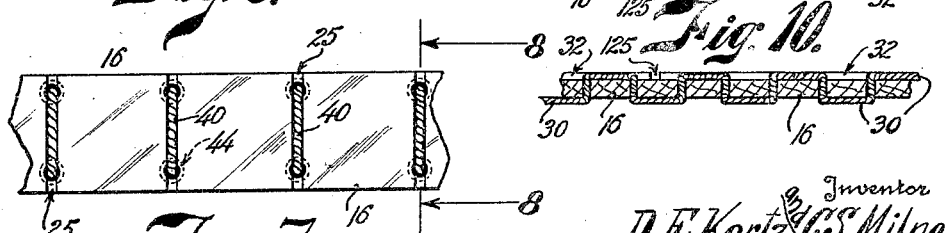
Fig. 7.
Inventor
D. E. Kortz & C. S. Milne
By Lynn L. Steele
Attorney.

Patented Feb. 17, 1925.

1,527,142

UNITED STATES PATENT OFFICE.

DAVID E. KORTZ AND CLAUDE S. MILNE, OF DENVER, COLORADO.

WOODEN LINING FOR BRAKE AND TRANSMISSION BANDS.

Application filed March 20, 1923. Serial No. 626,318.

*To all whom it may concern:*

Be it known that we, DAVID E. KORTZ and CLAUDE S. MILNE, citizens of the United States, and residents of the city and county of Denver, State of Colorado, have invented certain new and useful Improvements in Wooden Linings for Brake and Transmission Bands; and we do declare the following to be a full, clear, and exact description of the invention, such as will enable others skilled in the art to which it appertains to make and use the same, reference being had to the accompanying drawings, which form a part of this specification.

The object of this invention is to provide a highly serviceable lining for brakes and transmission bands which will not grab and chatter nor fill the oil with fibers as do fabric linings, and which will gradually and firmly engage the brake or transmission drum.

Briefly, the invention comprises a lining in the form of a wooden band or strip adapted to be secured to a brake or transmission band or the like, the lining preferably being of soft wood having a long fiber and capable of yielding somewhat and of absorbing a relatively large amount of lubricant. Such a wood is cotton-wood; it is valuable for the present purpose and will not disintegrate readily nor fill the oil with fibers. Preferably the band or lining of wood will be provided with grooves which may serve to collect and conduct oil to various parts of the lining, and certain of the grooves will be filled with a firm wicking, such as asbestos cord, which also will retain lubricant. Preferably the lining will be well saturated with lubricant before installation, and since the same is to be used ordinarily in an oil-containing casing wherein oil will be continuously conducted to or splashed upon the lining or a drum to be engaged thereby, proper lubrication will always be insured.

In the accompanying drawings wherein certain embodiments of the invention are disclosed by way of illustration, Fig. 1 is a cross section through a transmission casing showing a lining of the present invention in operative position upon a transmission drum;

Fig. 2 is a side elevation of the lining secured to the transmission band;

Fig. 3 is a face view of one form of lining;

Fig. 4 is a cross section therethrough on line 4—4 of Fig. 3;

Fig. 5 is a face view of a modified form of lining;

Fig. 6 is a longitudinal section therethrough taken on line 6—6 of Fig. 5;

Fig. 7 is a face view of a further modification;

Fig. 8 is a section therethrough taken on line 8—8 of Fig. 7;

Fig. 9 is a face view of a still further modification;

Fig. 10 is a longitudinal section therethrough showing the manner of lacing the asbestos cord or wicking and the arrangement of the grooves.

Fig. 1 of the drawings discloses a casing 10 having a cover 11 and enclosing a transmission of one form for automobiles which includes a transmission 12 and a fly wheel 14 or the like which splashes up oil from the bottom of the casing onto said drum. A resilient transmission band 15 of well known type carries a wooden lining 16 of the present invention which engages the drum 12, the lining 16 being secured to the band 15 as by rivets 17 in the usual manner and said band 15 being actuable for engagement of the drum as by means of a rod or shaft 18.

In the form of lining 16 of the present invention a preferably soft wood having a long fiber is employed, the grain extending the length of the lining. Cotton-wood is very serviceable for this purpose, since it is sufficiently tough for good service and porous enough to absorb considerable amounts of oil to insure proper lubrication. Being of long fiber, the lining of this wood does not break down readily and the oil is not filled with fibrous material.

Figs. 3 and 4 disclose such a lining 16 which is provided on the face which engages the drum, with longitudinally extending grooves 20 for conducting oil. Preferably these grooves 20 are provided with a wicking such as asbestos cord 22 or the like which shall be sufficiently firm to prevent ready disintegration and shall serve to absorb and conduct oil for thorough lubrication of the lining. The wicking may be tied through the band as at 24 to retain the same in the grooves.

Preferred forms of lining 16 are shown in Figs. 5 and 9, wherein the wicks in the form of cords 30 are threaded or laced back and forth through the lining. In the form of Figs. 5 and 6, the drum engaging face of the lining is provided with a plurality of transverse grooves 25 extending from edge to edge of the lining, while the face of the lining which is secured next to the spring transmission band 15 is provided with short longitudinally extending staggered grooves 26 located a short distance in from the edges of the lining. The wick 30 is laced back and forth from one face of the lining to the other and from one edge of the lining to the other so as to lie in the grooves 25 and 26, the bottoms of the grooves 25 communicating with holes 28 which pass through the lining and communicate with the ends of the grooves 26, the wick passing through said holes 28. In this manner oil is fed to the wick from the edges of the lining through the ends of the grooves 25.

In the form of Figs. 9 and 10, the lining 16 is shown as being provided with a pair of grooves 32 which extend the full length of the drum-engaging face of the band, and with an occasional transverse groove 125 like grooves 25 of Fig. 5. The wicks 30 extend longitudinally of the lining 16 but are laced back and forth from one face of the lining to the other so as to have portions thereof lying in the grooves 32 and other portions lying upon the opposite face of the lining and against the resilient band 15 when mounted thereon. Preferably the portions of wick lying in one groove 32 are staggered with relation to portions lying in the other groove as seen in Fig. 9. The transverse grooves 125 serve to feed oil inward from the edges of the lining to the grooves 32 and wicks 30. With this construction the combination of grooves and wicks keeps the lining well lubricated at all times in view of the fact that oil is always being splashed or fed to the drum and the edges of the lining 16 and band 15.

The form of Figs. 7 and 8 shows the lining 16 as being provided with the transverse grooves 25 only, short sections of wick 40 being secured therein and having their ends passed through the lining within the edges and knotted at 42 on the other side, the knots being countersunk in recesses 44. Thus the wicks 40 are well lubricated by means of the grooves 25.

The cotton-wood lining, or lining of other suitable wood, is shaped in any desired or known manner, so that it will itself have more or less resilience for the purpose of automatically withdrawing the lining from engagement with the drum when released. Before installation the lining 16 will be well saturated with lubricant so as to insure proper lubrication and proper operation from the beginning.

We claim:

1. A lining for brake and transmission bands having grooves on the operative face thereof, and wicking in the form of a cord laced back and forth through said lining and lying in certain of said grooves for absorbing oil.

2. A lining for brake and transmission bands having oil receiving grooves extending both transversely and longitudinally of the lining on the operative face thereof, and a wicking in the form of a cord laced back and forth through said lining and lying in certain of said grooves for absorbing oil.

3. A lining for brake and transmission bands formed of a long-fiber soft wood, said lining having grooves extending both transversely and longitudinally of the operative face of the band, and a wick threaded through said lining from face to face and lying in certain of said grooves for absorbing oil.

4. The combination with a transmission band, of a non-metallic lining mounted on the inner face of the band having spaced openings arranged in a longitudinal row, and a wick overlying the outer face of the lining having portions extending through said openings and partially overlying the inner face of the lining.

5. The combination with a transmission drum and a band encircling the drum, of a non-metallic lining interposed between the band and the drum and movable with the band, and a tape-like oil-absorbing wick interposed between the band and lining, spaced portions of said wick passing through the lining and being formed into loops adapted to spread the oil over the face of the drum.

6. In a transmission mechanism, the combination with the drum and a flexible metal band encircling the drum, of a non-metallic lining interposed between the drum and the band, said lining having spaced openings facing the drum, and an elongated wick adapted to be saturated with lubricating oil overlying the outer face of the lining and having looped portions extending through said openings adapted to distribute the oil over the periphery of the drum whenever said band is clamped to the drum.

In testimony whereof we affix our signatures.

DAVID E. KORTZ.
CLAUDE S. MILNE.